Patented July 13, 1937

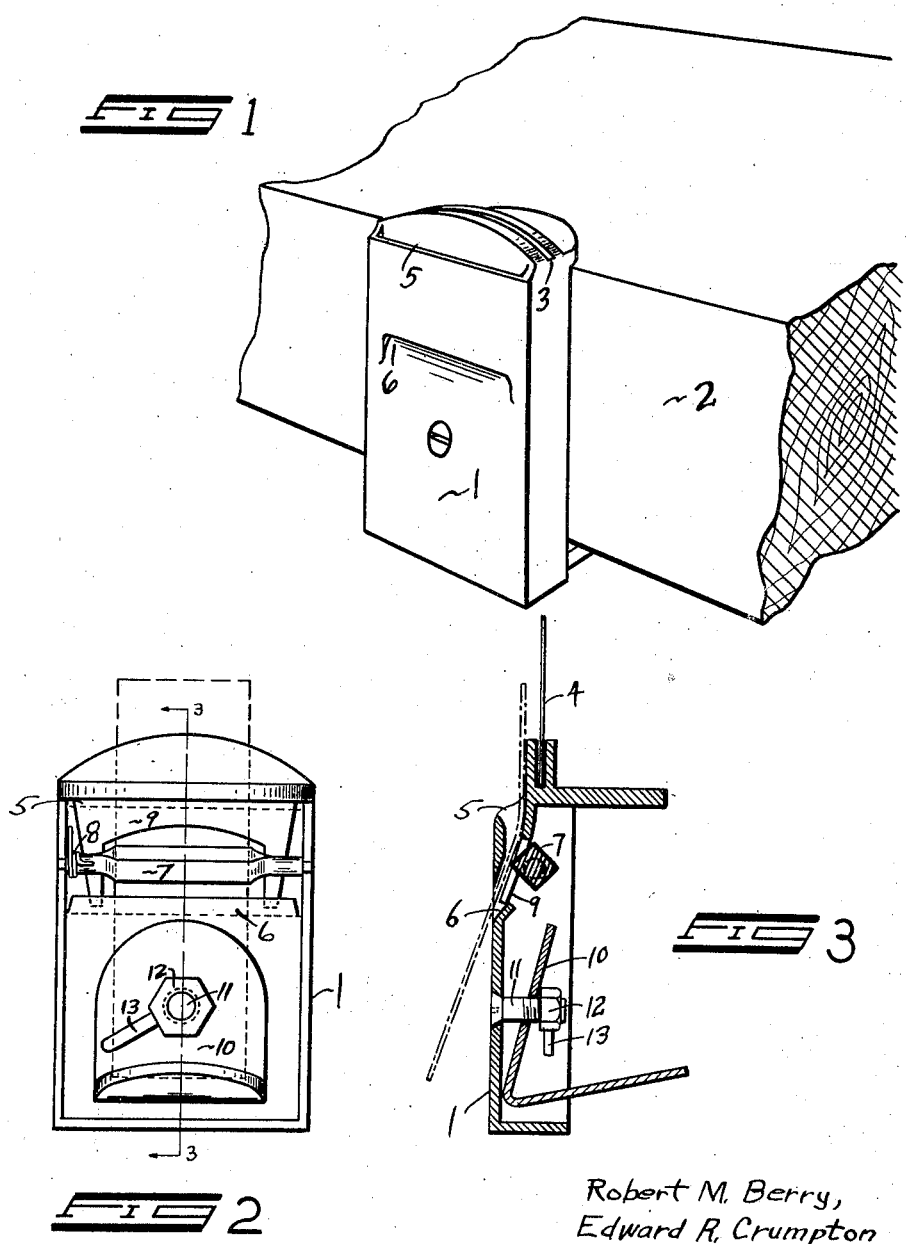

2,086,695

UNITED STATES PATENT OFFICE 2,086,695

CHECK HOLDER

Robert M. Berry, Uniontown, Pa., and Edward R. Crumpton, Youngstown, Ohio

Application April 8, 1937, Serial No. 135,690

3 Claims. (Cl. 40—10)

This invention relates to check holders.

The principal object of this invention is to provide a check holder for restaurant counters and the like.

A further object of this invention is to provide a check holder that will hold a check in a vertical position and permit removal of the check in a downward direction only.

A further object of this invention is to provide a check holder that may be readily clamped to a counter.

A further object of this invention is to provide a check holder having a slotted top section adapted to receive an advertising card or menu.

In this invention we have provided a novel check holder designed for use on a restaurant counter to enable the waitress to determine whether or not the customer has paid his check. After serving the customer, the check is placed in the check holder from the top, and serves as a reminder to the waitress that the check has not been paid. The check holder is so designed that the check cannot be removed from the top, but must be removed from the bottom by pulling the check downwardly from the holder. As the holder is mounted on the back of the counter, it would be difficult for the customer to reach over the counter and remove the check. When the check is paid the waitress easily removes the check by sliding it downwardly. It is obvious that the manner of use of the check holder may be varied from that outlined above.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a perspective view of a section of a restaurant counter with a check holder clamped thereon.

Figure 2 is a rear elevation of the check holder.

Figure 3 is a cross section taken on lines 3—3 of Figure 2.

By referring to the drawing it will be seen that a check holder 1 is shown clamped to a restaurant counter 2. A slot 3 is provided at the top of the check holder 1 and is adapted to receive an advertising card or similar object 4. An opening 5 formed in the top front section of the check holder is provided for the insertion of a check, and a slot 6 is formed in the same front section and adapted to guide the check outwardly from the holder at this point.

By referring to Figure 2 of the drawing it will be seen that a catch bar 7 is positioned within the check holder so as to effectively hold the check in position. This catch bar 7 is formed with squared corners and so placed that one of the squared corners will wedge against the check when the check is pulled upwardly. A spring 8 is positioned on one end of the catch bar 7 and serves to hold the catch bar under slight tension against the check. A guide member 9 is positioned within the check holder and has a cut out section therein so that the check may come in contact with the catch bar 7. This guide 9 effectively guides the check into the lower slot 6 where the lower end emerges. In order to clamp the check holder to a counter a semi-U-shaped clamping member 10 is provided, the vertical part of which is placed over a threaded bolt 11. A nut 12 having an arm 13 formed thereon is placed on the bolt 11. The arm 13 is designed to abut part of the clamp member 10, thus preventing rotation of the nut 12. When the bolt 11 is rotated the nut 12 will travel inwardly, forcing the clamp member 10 against the bottom of the counter thus clamping the check holder to the counter.

What we claim is:—

1. In a check holder comprising a body member, an opening formed at the top of the body member and a second opening formed in the front of said body member to permit the insertion of a check therethrough, a square cornered catch bar within said body member and a spring on one end of said catch bar to hold the catch bar under slight tension against a check, means for clamping said body member to a restaurant counter, substantially as described.

2. In a check holder, a double slotted body member, a guide within said body member for directing a check through the slotted portion of the body member, a square cornered catch bar within said body member and a spring on one end of said catch bar to hold the catch bar under slight tension against the check in order to permit the removal of the check in a downward direction only, a semi-U-shaped clamping member bolted to said body member for clamping the body member to a restaurant counter.

3. In a check holder comprising a body member, an opening formed at the top of the body member and a second opening formed in the front of said body member, a guide within said body member for directing a check through the second opening, a catch bar within said body member and a spring on one end of said catch bar to hold the catch bar under slight tension against a check to permit the removal of the check in a downward direction only, a clamping member bolted to said body member for clamping the body member to a restaurant counter.

ROBERT M. BERRY.
EDWARD R. CRUMPTON.